United States Patent [19]

Onizuka

[11] Patent Number: 4,623,773
[45] Date of Patent: Nov. 18, 1986

[54] ELECTROSPARK MACHINING SOLUTION

[75] Inventor: Masahiro Onizuka, Aichi, Japan

[73] Assignee: Mitsubishi Denki Kabushiki Kaisha, Tokyo, Japan

[21] Appl. No.: 590,602

[22] Filed: Mar. 19, 1984

Related U.S. Application Data

[63] Continuation of Ser. No. 227,903, Jan. 23, 1981, abandoned.

[30] Foreign Application Priority Data

Jan. 29, 1980 [JP] Japan .................................. 55-9095
Aug. 29, 1980 [JP] Japan ............................... 55-119226

[51] Int. Cl.$^4$ .............................................. B23P 1/08
[52] U.S. Cl. ............................... 219/69 D; 219/69 M; 219/69 R; 204/129.95; 536/1.1; 524/180
[58] Field of Search ............... 219/69 M, 69 R, 69 D, 219/69 W; 204/129.6, 129.75, 129.95; 536/1.1; 424/180; 252/570

[56] References Cited

U.S. PATENT DOCUMENTS

| | | |
|---|---|---|
| 2,937,940 | 5/1960 | Weisberg et al. ........................ 75/97 |
| 3,269,964 | 8/1966 | Curtis .................... 536/1.1 |
| 3,334,210 | 8/1967 | Williams et al. ................. 219/69 D |
| 3,389,066 | 6/1968 | Shibasaki ........................ 204/129.95 |
| 3,766,165 | 10/1973 | Rennhard ............................. 536/1.1 |
| 4,039,662 | 8/1977 | Hecht et al. ......................... 424/180 |
| 4,148,699 | 4/1979 | Mayer et al. .................... 204/129.95 |

Primary Examiner—M. H. Paschall
Attorney, Agent, or Firm—Sughrue, Mion, Zinn, Macpeak and Seas

[57] ABSTRACT

A nonflammable electrospark machining solution which provides a high machining rate composed primarily of a saccharide such as cane sugar, fruit sugar or malt sugar with the density of saccharide being 5 to 55% by weight. A preservative may be added such as benzoic acid, salicylic acid, dehydroacetic acid or ethyl para-hydroxybenzoate with the latter being preferred in an amount of 0.01 to 0.1% by weight of the machining solution. Also, an anticorrosive such as sodium nitride, sodium polyphosphate, sodium dichromate, sodium silicate and triethanol amine is preferably added in an amount of 0.05 to 0.1% by weight of the machining solution.

40 Claims, 1 Drawing Figure

ELECTROSPARK MACHINING SOLUTION

This is a Continuation of application Ser. No. 227,903 filed Jan. 23, 1981, now abandoned.

BACKGROUND OF THE INVENTION

The present invention relates to a machining solution intended for use in electrospark machining.

A so-called "ordinary electrospark machining method" using a mold electrode and a wire type electrospark machining method employing a wire electrode are well known in the art. In each of these methods, a machining electrode is confronted with a workpiece in a machining solution with a gap between the electrode and workpiece and the workpiece is machined by sparks produced in the gap.

During the electrospark machining operation, machining solution is abruptly vaporized by columns of sparks to produce a high pressure which dislodges molten parts of the workpiece. The machining solution also serves to cool molten fine metal particles which have been scattered from the workpiece thereby to remove machining chips, decomposed carbon particles, and other unwanted debris from the machining gap.

In general, the machining solution used with the wire type electrospark machining method is water. Therefore, there is little danger of fire caused by the machining solution. On the other hand, an inflammable oil such as mineral oil, which is a good insulator, is generally employed as the machining solution used with the ordinary electrospark machining method because water greatly reduces the machining rate. Unfortunately, if the level of the inflammable machining solution in the machining bath decreases significantly during an electrospark machining operation, the solution may be ignited by the sparks resulting in a fire. Thus, the ordinary electrospark machining method is disadvantageous in that it is necessary to provide a way of preventing the inflammable machining solution from igniting.

However, since a inflammable machining solution must be used as a practical matter, the ordinary electrospark machining method suffers from a drawback in that, even if a way is provided for preventing ignition of the machining solution, it is impossible to assure that unmanned operation is absolutely safe for long periods. Furthermore, the inflammable mineral oil itself involves a problem in that it is malodorous, somewhat poisonous and presents a sanitation problem in that it tends to stick to the hands of the operator.

In order to prevent fires, a nonflammable oil such as a silicon oil, fluorinated oil or chlorinated oil may be employed as the machining oil. However, silicon oil and fluorinated oil are considerably expensive and chlorinated oil is poisonous.

SUMMARY OF THE INVENTION

Accordingly, a first object of the invention is to provide an electrospark machining solution which is nonflammable and which provides an excellent machining rate. A second object of the invention is to provide an electrospark machining solution which has no foul odor and is excellent so far a safety and sanitation are concerned.

A third object of the invention is to provide an electrospark machining solution which can be prepared at low cost.

A fourth object of the invention is to provide an electrospark machining solution which has a sufficiently high preservative effect.

A fifth object of the invention is to provide an electrospark machining solution which has a predetermined insulation resistance and provides a predetermined machining rate.

The foregoing objects and other objects of the invention are met by an electrospark machining solution comprising primarily an aqueous solution of saccharide to which may be added a preservative agent and/or an anticorrosive agent.

BRIEF DESCRIPTION OF THE DRAWING

In the accompanying drawing, the single

DESCRIPTION OF THE PREFERRED EMBODIMENTS

Figure 1:
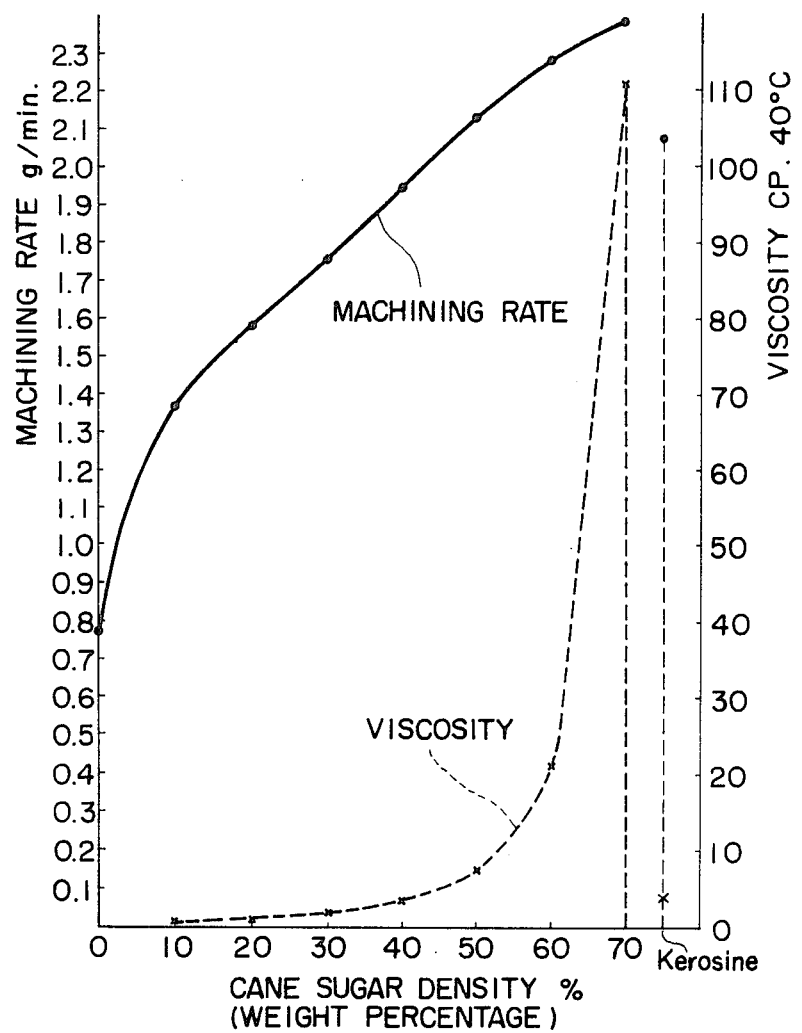
FIG. 1 is a graphical representation indicating characteristic curves showing machining rate with cane sugar density and viscosity with cane sugar density.

The invention, which as been developed in order to eliminate difficulties accompanying conventional electrospark machining solutions, provides electrospark machining solutions which are nonflammable and do not harm machining performance. In accordance with the invention, an aqueous solution of saccharide is employed as an electrospark machining solution.

A homogeneous saccharide aqueous solution can easily be obtained by dissolving saccharide in water and the fluidity of the saccharide aqueous solution thus obtained can be changed as desired by adjusting its density. The saccharide aqueous solution has an insulating characteristic high enough to cause spark discharge between a workpiece and a machining electrode. By way of example, the electrical conductivities of white sugar (cane sugar) with different densities are as indicated in Table 1 below:

TABLE 1

| White sugar density (% by weight) | 50% | 40% | 30% | 20% |
|---|---|---|---|---|
| Electrical conductivity 25° C. $\mu v/cm$ | 2.30 | 3.75 | 4.79 | 4.52 |

A preferred embodiment of the invention will be described. In order to compare machining rates which are obtained employing saccharide aqueous solutions for machining solutions with those which are provided employing conventional machining oil and water as the machining solutions, quenched steels were electrospark-machined with a copper machining electrode under the same electrical conditions. The results of the electrospark machining tests are as indicated in Table 2 below:

TABLE 2

| Machining solution | Machining rate |
|---|---|
| Conventional machining oil | 1.8 g/min |
| Water | 0.5 |
| 20% (by weight) saccharide aqueous solution | 1.6 |
| 30% (by weight) saccharide aqueous solution | 1.7 |

As is apparent from Table 2, machining rates of the machining solutions according to the invention are several times that of water and are substantially equal to that of conventional machining oil. In addition, it has been found that the surfaces of the workpieces machined with machining solutions of the invention are more satisfactory than that obtained using water or conventional machining oil as the machining solution.

The relationship between the machining rate and the machining solution density will be described with reference to FIG. 1 in which a cane sugar aqueous solution was employed as the machining solution by way of example. As the machining solution density increases, the machining rate increases. However, it should be noted that, when the machining solution density exceeds 55% by weight, the viscosity of the machining liquid increases abruptly. As the viscosity of the machining solution increases as described above, the permeability of the machining solution decreases as a result of which it is difficult to remove powder which is created by the electrospark machining. This is undoubtedly unsuitable for electrospark machining. In addition, as the viscosity of the solution increases, the roughness of the machined surface correspondingly increases. Therefore, it can be considered that the optimum machining density ranges from 5% to 55% by weight. If kerosene is used as the machining solution, the machining rate is about 2.1 g/min and the viscosity is about 2 cp at 40° C.

In the above-described embodiment, cane sugar (white sugar) is used. However, the same effects can be obtained using grape sugar, fruit sugar and malt sugar. These sugars may be used solely or in combination. Additives may be added to the sugars. The density of the saccharide aqueous solution is not always limited to those described above and it may be varied within an electrospark machining enabling range as indicated in FIG. 1. The machining solution of the invention is applicable not only to the ordinary electrospark machining method but also to other electrospark methods where a wire is used as the machining electrode.

In machining a workpiece with the nonflammable saccharide aqueous solution of the invention as the machining solution, no fire is caused even if a mistake is made during the machining operation. Accordingly, an electrospark machining device can be so designed that it automatically machines workpieces which is an important labor-saving feature. The machining solution of the invention produces no foul odor. Even if the machining solution sticks to the hands of the operator, there is no danger as the solution is not poisonous. Thus, the machining solution of the invention is free from sanitary hazards and can be used in safety which contributes to an improvement of the machining work efficiency. In addition, the machining solution of the invention can be readily prepared.

An anticorrosive may be employed as an additive to the saccharide aqueous solution of the invention in order to eliminate a difficulty that, when an electrospark machining operation is carried out using saccharide aqueous solution, for long periods of time, the workpiece corrodes during the machining operation. Examples of appropriate anticorrosives are sodium nitride, sodium polyphosphate, sodium dichromate and sodium silicate. However, especially triethanol amine in an amount of 0.05 to 0.1% by the weight of the nonflammable machining solution is most suitable in terms of its density, insulating properties and the machining rate provided.

Furthermore, a preservative may be employed as an additive to the above-described saccharide aqueous solution. The use of a preservative is effective in eliminating the difficulty that, when an electrospark machining operation is carried out with a nonflammable machining solution including saccharide for long periods of time, the machining solution may be spoiled during the machining operation thus reducing the service life of an ion exchange bath which is provided for maintaining the resistivity of the machining solution.

Electrospark machining solutions prepared by adding benzoic acid, salicylic acid and dehydroacetic acid as preservatives to nonflammable machining solutions including saccharide aqueous solution have been tested. However, with these preservatives it has been difficult to obtain sufficient preservative effects with an acceptable insulation resistance.

The insulation resistance property will be discussed in more detail. If benzoic acid of 0.1% by weight is added to the nonflammable machining solution including the saccharide solution, the resulting resistivity is $2.3 \times 10^3$ Ωcm, if 0.1% of salicylic acid is added thereto, the resistivity is $8.0 \times 10^2$ Ωcm, and if dehydroacetic acid of 0.1% is added thereto, the resistivity is $9.5 \times 10^3$ Ωcm. In order to obtain a preferred insulation resistance of $1 \times 10^4$ Ωcm, it is necesary to reduce the density of the preservative to a considerably low value. A solution with a preservative the density of which is thus reduced has a considerably low preservative effect to the extent that it is not practical for use as a machining solution.

In order to eliminate the above-described difficulty and to provide an electrospark machining solution which can provide the desired insulation resistance and machining rate as in a nonflammable machining solution containing saccharide solution and is yet sufficiently effective in preservation, a machining solution has been prepared by adding an alkyl para-hydroxybenzoate, specifically ethyl para-hydroxybenzoate of 0.01% to 0.1% by weight to the nonflammable machining solution containing saccharide solution.

The relation between the density of ethyl para-hydroxybenzoate and the preservative effect will be specifically described. Table 3 below indicates the relationships between machining solutions of different densities, time until the solutions are spoiled, and the resistivities of the solutions after thirty days.

TABLE 3

| Solution | Period until spoiled | Resistivity in 30 days |
|---|---|---|
| 30% cane sugar aqueous solution | 22 days | $2.5 \times 10^4$ Ωcm |
| 30% cane sugar aqueous solution + 0.005% ethyl para-hydroxybenzoate | 30 days | $4.7 \times 10^4$ Ωcm |
| 30% cane sugar aqueous solution + 0.01% ethyl para-hydroxybenzoate | 65 days | $9.3 \times 10^4$ Ωcm |
| 30% cane sugar aqueous solution + 0.1% ethyl para-hydroxybenzoate | more than 65 days | $1.2 \times 10^5$ Ωcm |

As is apparent from Table 3, a machining solution containing ethyl para-hydroxybenzoate in an amount of 0.01 to 0.1% has the desired insulation resistance ($1 \times 10^4$ Ωcm) and maintains it for a long period of time and has a sufficiently high preservative effect.

Now, the relation between the density of ethyl para-hydroxybenzoate and the machining rate will be described.

Table 4 indicates the machining rates for electrospark machining solutions. As is clear from Table 4, an electrospark machining solution prepared by adding 0.1% by wieght of para-hyroxybenzoate 0.1% to 30% cane sugar solution is substantially equal in machining rate to that prepared using 30% cane sugar solution.

TABLE 4

| Machining solution | Machining rate |
|---|---|
| 30% cane sugar aqueous solution | 1.80 g/min |
| 30% cane sugar aqueous solution + 0.1% ethyl para-hydroxybenzoate | 1.83 g/min |

As is apparent from the above description, in order to prepare a machining solution which is equivalent in insulation resistance and machining rate to a nonflammable machining solution containing saccharide solution and which is sufficiently high in preservative effect, it is preferable to add ethyl para-hydroxybenzoate of 0.01 to 0.1% by weight to the cane sugar aqueous solution.

According to the invention, a machining solution is provided which has the desired insulation resistance and machining rate and has a sufficiently high preservative effect by adding 0.01 to 0.1% by weight ethyl para-hydroxybenzoate to the described nonflammable machining solution containing saccharide solution.

What is claimed is:

1. An electrospark machining device comprising an electrospark machining electrode positioned in a nonflammable electrospark machining solution consisting essentially of an aqueous solution of saccharide, said machining solution having an electrical insulating characteristic high enough to cause spark discharge, and power means to produce a spark discharge (high power density arcs) in a gap between said electrode and an electrically conductive work piece, whereby spark discharges from said electrode are produced in a gap between said electrode and said work piece to machine said work piece when said device is used for electrospark machining.

2. An electrospark machining device comprising an electrospark machining electrode positioned in a nonflammable electrospark mmachining solution having an insulation resistance of at least $1 \times 10^4$ Ωcm, said solution consisting essentially of an aqueous solution of saccharide, and power means to produce a spark discharge (high power density arcs) in a gap between said electrode and an electrically conductive work piece, whereby spark discharges from said electrode are produced in a gap between said electrode and said work piece to machine said work piece when said device is used for electrospark machining.

3. The electrospark machining device as claimed in claim 1 or 2 in which said saccharide comprises at least one sugar selected from the group consisting of cane sugar, fruit sugar and malt sugar.

4. The electrospark machining device as claimed in claim 1 or 2 in which the amount of saccharide in said aqueous solution of saccharide is from 5 to 55% by weight of said aqueous solution.

5. The electrospark machining device as claimed in claim 1 or 2, said aqueous solution further comprising a preservative.

6. The electrospark machining device as claimed in claim 5 wherein said preservative is selected from the group consisting of benzoic acid, salicylic acid, dehydroacetic acid and ethyl para-hydroxybenzoate.

7. The electrospark machining device as claimed in claim 6 in which said preservative is alkyl para-hydroxybenzoate.

8. The electrospark machining device as claimed in claim 6 in which said preservative is ethyl para-hydroxybenzoate of 0.01 to 0.1% by weight of said nonflammable machining solution.

9. The electrospark machining device as claimed in claim 1 or 2 said aqueous solution further comprising an anticorrosive additive selected from the group consisting of sodium nitride, sodium polyphosphate, sodium dichromate, sodium silicate and triethanol amine.

10. The electrospark machining device as claimed in claim 1 or 2 further comprising an anticorrosive additive consisting of 0.05 to 0.1% by weight of said nonflammable machining solution of triethanol amine.

11. The electrospark machining device as claimed in claim 3 in which the amount of saccharide in said aqueous solution of saccharide is from 5 to 55% by weight of said aqueous solution.

12. The electrospark machining device as claimed in claim 3 said aqueous solution further comprising an anticorrosive additive selected from the group consisting of sodium nitride, sodium polyphosphate, sodium dichromate, sodium silicate and triethanol amine.

13. The electrospark machining device as claimed in claim 5 said aqueous solution further comprising an anticorrosive additive selected from the group consisting of sodium nitride, sodium polyphosphate, sodium dichromate, sodium silicate and triethanol amine.

14. The electrospark machining device as claimed in claim 6 said aqueous solution further comprising an anticorrosive additive selected from the group consisting of sodium nitride, sodium polyphosphate, sodium dichromate, sodium silicate and triethanol amine.

15. The electrospark machining device as claimed in claim 7 further said aqueous solution comprising an anticorrosive additive selected from the group consisting of sodium nitride, sodium polyphosphate, sodium dichromate, sodium silicate and triethanol amine.

16. The electrospark machining device as claimed in claim 8 further said aqueous solution comprising an anticorrosive additive selected from the group consisting of sodium nitride, sodium polyphosphate, sodium dichromate, sodium silicate and triethanol amine.

17. The electrospark machining device as claimed in claim 3 further comprising an anticorrosive additive consisting of 0.05 to 0.1% by weight of said nonflammable machining solution of triethanol amine.

18. The electrospark machining device as claimed in claim 5 further comprising an anticorrosive additive consisting of 0.05 to 0.1% by weight of said nonflammable machining solution of triethanol amine.

19. The electrospark machining device as claimed in claim 6 further comprising an anticorrosive additive consisting of 0.05 to 0.1% by weight of said nonflammable machining solution of triethanol amine.

20. The electrospark machining device as claimed in claim 7 further comprising an anticorrosive additive consisting of 0.05 to 0.1% by weight of said nonflammable machining solution of triethanol amine.

21. A process comprising the steps of
(a) disposing an electrically conductive workpiece to be machined in a non-flammable electrospark machining solution consisting essentially of an aqueous solution of saccharide and having a high electrical insulating characteristic, and (b) applying a sufficient electrical voltage between said workpiece and an electrode positioned in said electrospark machining solution to produce spark discharges (high power density arcs) from said electrode in a gap between said electrode and said workpiece to electrospark machine said workpiece.

22. A process comprising the steps of
(a) disposing an electrically conductive workpiece to be machined in a non-flammmable electrospark machining solution having an insulation resistance of at least $1 \times 10^4$ $\Omega$cm, said solution consisting essentially of an aqueous solution of saccharide, and
(b) applying a sufficient electrical voltage between said workpiece and an electrode positioned in said electrospark machining solution to produce spark discharges (high power density arcs) from said electrode in a gap between said electrode and said workpiece to electrospark machine said workpiece.

23. The process as claimed in claim 21 or 22 in which said saccharide comprises at least one sugar selected from the group consisting of cane sugar, fruit sugar and malt sugar.

24. The process as claimed in claim 21 or 22 in which the amount of saccharide in said aqueous solution of saccharide is from 5 to 55% by weight of said aqueous solution.

25. The process as claimed in claim 11 or 22, said aqueous solution further comprising a preservative.

26. The process as claimed in claim 25 wherein said preservative is selected from the group consisting of benzoic acid, salicylic acid, dehydroacetic acid and ethyl para-hydroxybenzoate.

27. The process as claimed in claim 26 in which said preservative is alkyl para-hydroxybenzoate.

28. The process as claimed in claim 26 in which said preservative is ethyl para-hydroxybenzoate of 0.01 to 0.1% by weight of said nonflammable machining solution.

29. The process as claimed in claim 21 or 22, said aqueous solution further comprising an anticorrosive additive selected from the group consisting of sodium nitride, sodium polyphosphate, sodium dichromate, sodium silicate and triethanol amine.

30. The process as claimed in claim 21 or 22 further comprising an anticorrosive additive consisting of 0.05 to 0.1% by weight of said nonflammable machining solution of triethanol amine.

31. The process as claimed in claim 23 in which the amount of saccharide in said aqueous solution of saccharide is from 5 to 55% by weight of said aqueous solution.

32. The process as claimed in claim 23, said aqueous solution further comprising an anticorrosive additive selected from the group consisting of sodium nitride, sodium polyphosphate, sodium dichromate, sodium silicate and triethanol amine.

33. The process as claimed in claim 25, said aqueous solution further comprising an anticorrosive additive selected from the group consisting of sodium nitride, sodium polyphosphate, sodium dichromate, sodium silicate and triethanol amine.

34. The process as claimed in claim 26, said aqueous solution further comprising an anticorrosive additive selected from the group consisting of sodium nitride, sodium polyphosphate, sodium dichromate, sodium silicate and triethanol amine.

35. The process as claimed in claim 27, said aqueous solution further comprising an anticorrosive additive selected from the group consisting of sodium nitride, sodium polyphosphate, sodium dichromate, sodium silicate and triethanol amine.

36. The process as claimed in claim 28 said aqueous solution further comprising an anticorrosive additive selected from the group consisting of sodium nitride, sodium polyphosphate, sodium dichromate, sodium silicate and triethanol amine.

37. The process as claimed in claim 23 further comprising an anticorrosive additive consisting of 0.05 to 0.1% by weight of said nonflammable machining solution of triethanol amine.

38. The process as claimed in claim 25 further comprising an anticorrosive additive consisting of 0.05 to 0.1% by weight of said nonflammable machining solution of triethanol amine.

39. The process as claimed in claim 26 further comprising an anticorrosive additive consisting of 0.05 to 0.1% by weight of said nonflammable machining solution of triethanol amine.

40. The process as claimed in claim 27 further comprising an anticorrosive additive consisting of 0.05 to 0.1% by weight of said nonflammable machining solution of triethanol amine.

* * * * *